United States Patent [19]

Dola

[11] 4,225,162
[45] Sep. 30, 1980

[54] LIQUID TIGHT CONNECTOR

[75] Inventor: Frank P. Dola, Port Richey, Fla.

[73] Assignee: AMP Incorporated, Harrisburg, Pa.

[21] Appl. No.: 944,100

[22] Filed: Sep. 20, 1978

[51] Int. Cl.² ............................................. F16L 3/04
[52] U.S. Cl. .................. 285/161; 174/65 R; 285/242; 285/251; 285/331; 285/423; 285/DIG. 22
[58] Field of Search ............... 285/331, 322, 242, 243, 285/255, 251, DIG.22, 423, 158, 161; 174/65 R

[56] References Cited

U.S. PATENT DOCUMENTS

| 3,262,721 | 7/1966 | Knight | 285/242 X |
|---|---|---|---|
| 3,462,539 | 8/1969 | Winston | 285/158 X |
| 3,492,410 | 1/1970 | Kelly | 174/65 R |
| 3,493,672 | 2/1970 | Bromberg | 174/65 R |
| 3,549,177 | 12/1970 | Sotolongs | 285/161 X |
| 3,603,912 | 9/1971 | Kelly | 174/65 SS |
| 3,724,882 | 4/1973 | Dehar | 285/243 |
| 3,840,256 | 10/1974 | Cox | 285/331 X |
| 3,853,338 | 12/1974 | Wilson | 285/DIG. 22 |
| 3,971,578 | 7/1976 | Schemith | 285/423 |
| 3,997,195 | 12/1976 | Bartholomew | 285/331 X |

Primary Examiner—Dave W. Arola
Attorney, Agent, or Firm—Anthony S. Volpe

[57] ABSTRACT

The disclosure is directed to a pre-assembled liquid tight connector for use with flexible metallic conduit. The connector is comprised of a one piece body member having a grounding member formed integrally therewith. Additionally, the body member is so constructed as to retain a resilient polyurethane collar in a pre-loaded position so that after assembling the ground conductor to the flexible metallic conduit, the collar is simply pried from the pre-load position and a liquid tight seal is achieved.

9 Claims, 7 Drawing Figures

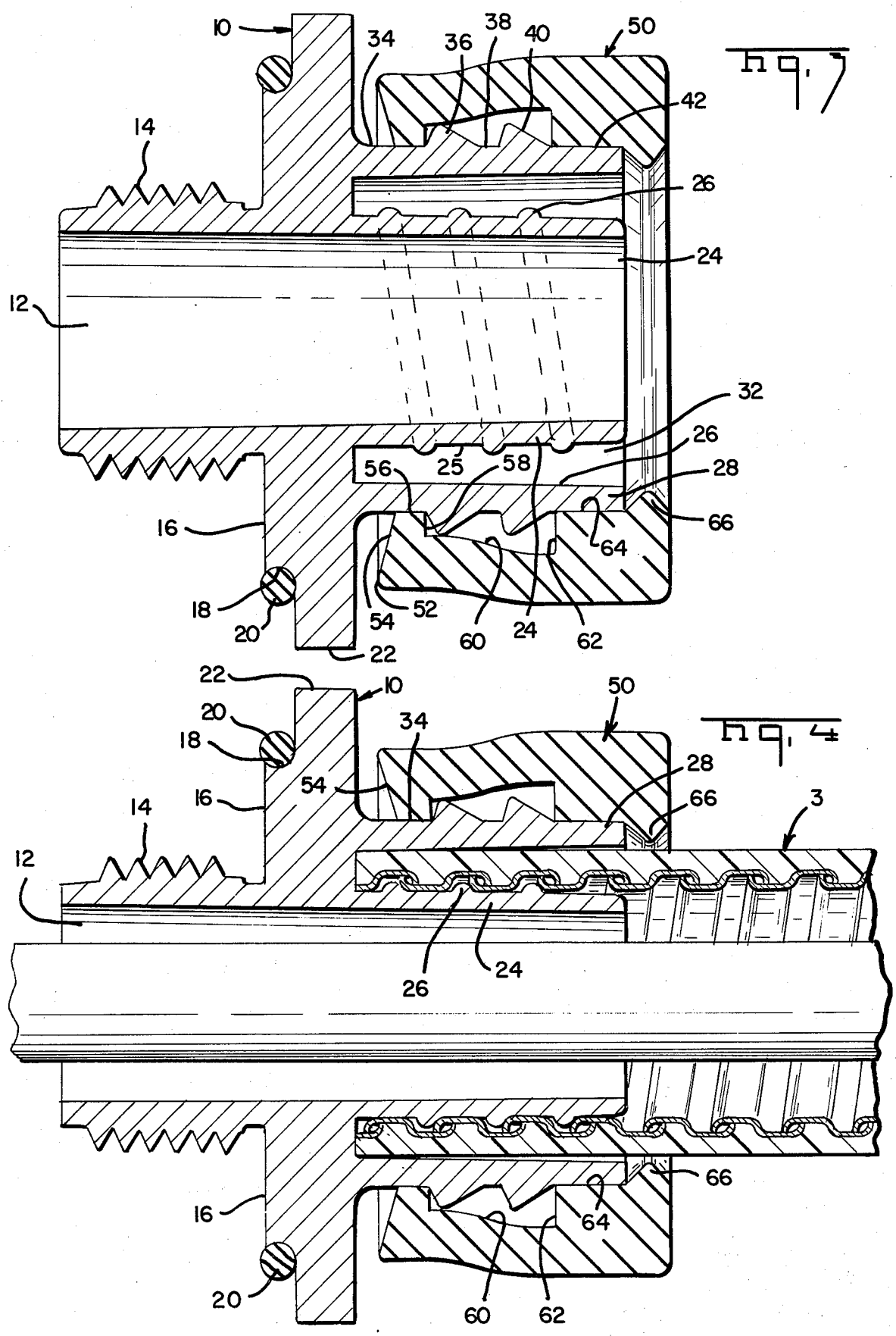

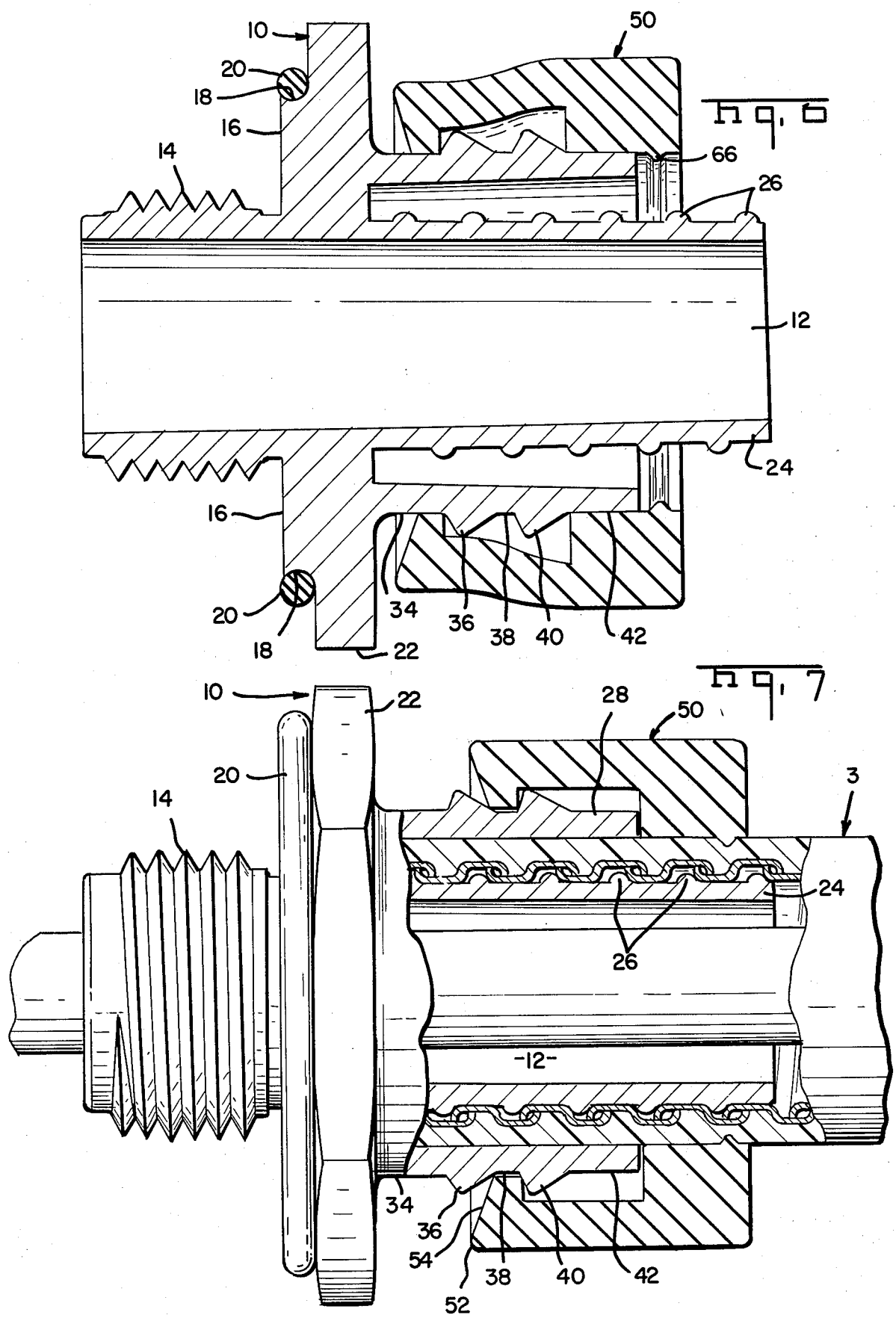

LIQUID TIGHT CONNECTOR

BACKGROUND

1. Field of the Invention

The instant invention is useful in the field of coupling flexible metallic conduit to electrical enclosures and more particularly to coupling jacketed flexible metallic conduit to electrical enclosures in a manner which provides both a liquid tight connection and a means for grounding of the metallic conduit to the electrical enclosure.

2. Description of the Prior Art

Prior Art devices generally require at least four separate elements to construct a connector. The elements generally required are a body for attachment to the electrical enclosure, a grounding sleeve, a sealing ring and a gland nut. Thus, each connector is constructed of separate parts which must be assembled prior to installation. Additionally, the mechanic assembling the connector must exercise care to avoid overtightening of the gland and the associated destruction of the sealing ring.

SUMMARY OF THE INVENTION

The present invention overcomes the prior art difficulties by providing a fully pre-assembled and pre-loaded one piece connector. The grounding sleeve of the instant connector is formed integrally with the body of the connector to assure a positive grounding connection. Furthermore, the use of a pre-loaded collar mounted on the one piece body assures that a proper compressive force will be provided without the associated danger of excessive force destroying the liquid tight quality.

BRIEF DESCRIPTION OF THE DRAWINGS

FIG. 3 is a sectional view of an assembled connector according to the instant invention.

FIG. 4 is a sectional view of an assembled connector after attachment of flexible metallic conduit but before the liquid tight seal is achieved.

FIG. 6 is a sectional view of an alternative embodiment of the instant invention.

FIG. 7 is a sectional view of an alternative embodiment of the instant invention fully assembled.

Referring to FIG. 2, there is shown, in an exploded sectional view, a fitting constructed in accordance with the concepts of the invention. Conductor receiving passage 12 extends throughout body portion 10 as shown. Body portion 10 has at a first end thereof an externally threaded portion 14 for insertion within the knockout of an electric panel (not shown) which receives a locknut (not shown) for securing body portion 10 to the electrical panel. In the preferred embodiment, threaded portion 14 is a National Pipe thread tapered thread which produces a compressive fix when secured to the electrical panel. Shoulder portion 16 adjacent to threaded portion 14 has therein a recess 18 which is dimensioned to receive an O-ring 20. Shoulder 16 is dimensioned to abut the electrical panel and prevent overtightening and distortion of O-ring 20. Adjacent shoulder 16 is flange 22 having a plurality of wrench flats as an aide in securing the body to an electrical panel. Immediately adjacent flange 22 there is ground contact sleeve 24. Exterior surface 25 of sleeve 24 has a slight inward taper beginning adjacent flange 22 and running to the end thereof. Integral with exterior surface 25 there is a spiral rib 26, which runs from the free end of sleeve 24 toward flange 22 and is dimensioned to thread into the voids found in the flexible metallic conduit of flexible jacketed cable. The construction of flexible jacketed cable and the nature of the said voids is well known to those skilled in the art and needs no further explanation herein.

Figure 1:
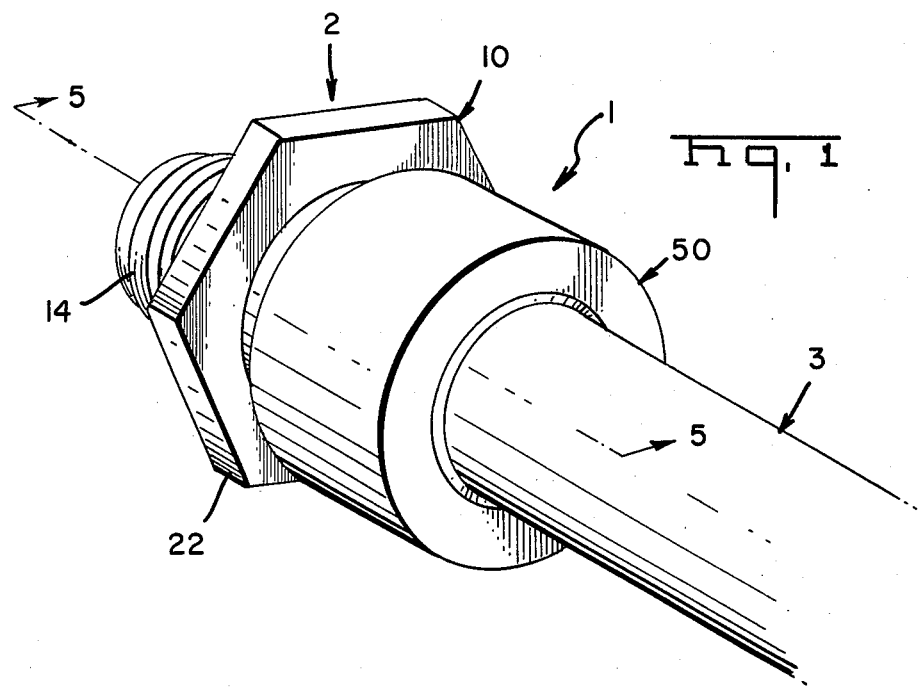
FIG. 1 is a perspective view of a connector according to the instant invention assembled to conduit.

Adjacent flange 22 there is a second cylindrical projection 28. Second cylindrical projection 28 has a smooth interior surface 30 which is oppositely tapered and dimensioned away from first cylindrical projection 24 by a distance sufficient to permit the jacketed flexible conduit of the cable to be screwed on the spiraled rib 26 and received in the tapered cavity 32 (see FIG. 3). The tapered shape of cavity 32 aides easy entrance and still permits some compression of the conduit adjacent flange 22. The exterior of second cylindrical projection 28 has a smooth surface 34 adjacent flange 22, a first rib 36 adjacent surface 34, a second smooth surface 38 adjacent rib 36, a second rib 40 adjacent second surface 38 and a smooth surface 42 adjacent second rib 40. Ribs 36 and 38 in the preferred embodiment are essentially 30°-60°-90° right triangles integral at their hypotenuse with projection 28. This ribbed configuration is an aide in assembly and provides a stop means after unloading of the liquid tight collar.

Figure 2:
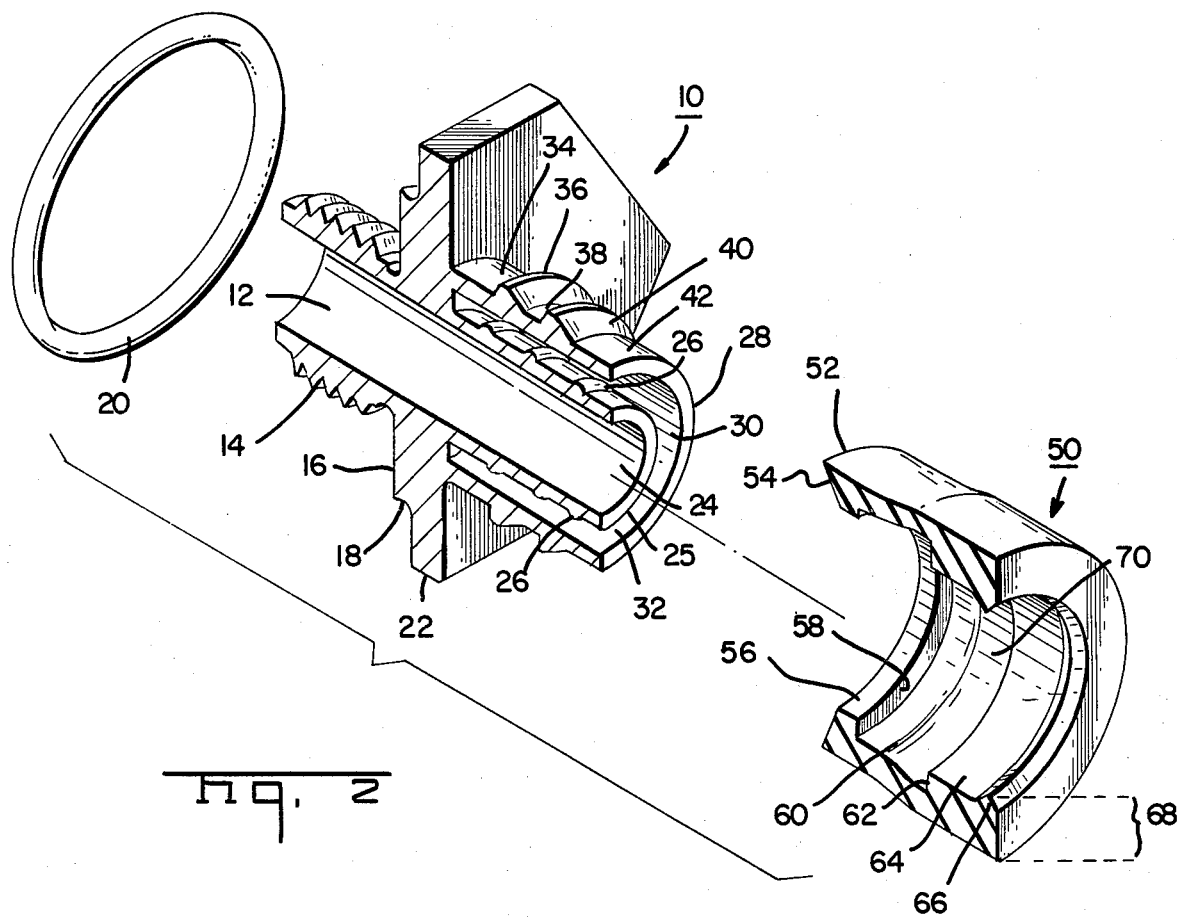
FIG. 2 is an exploded sectional view of an unassembled connector according to the instant invention.
Figure 5:
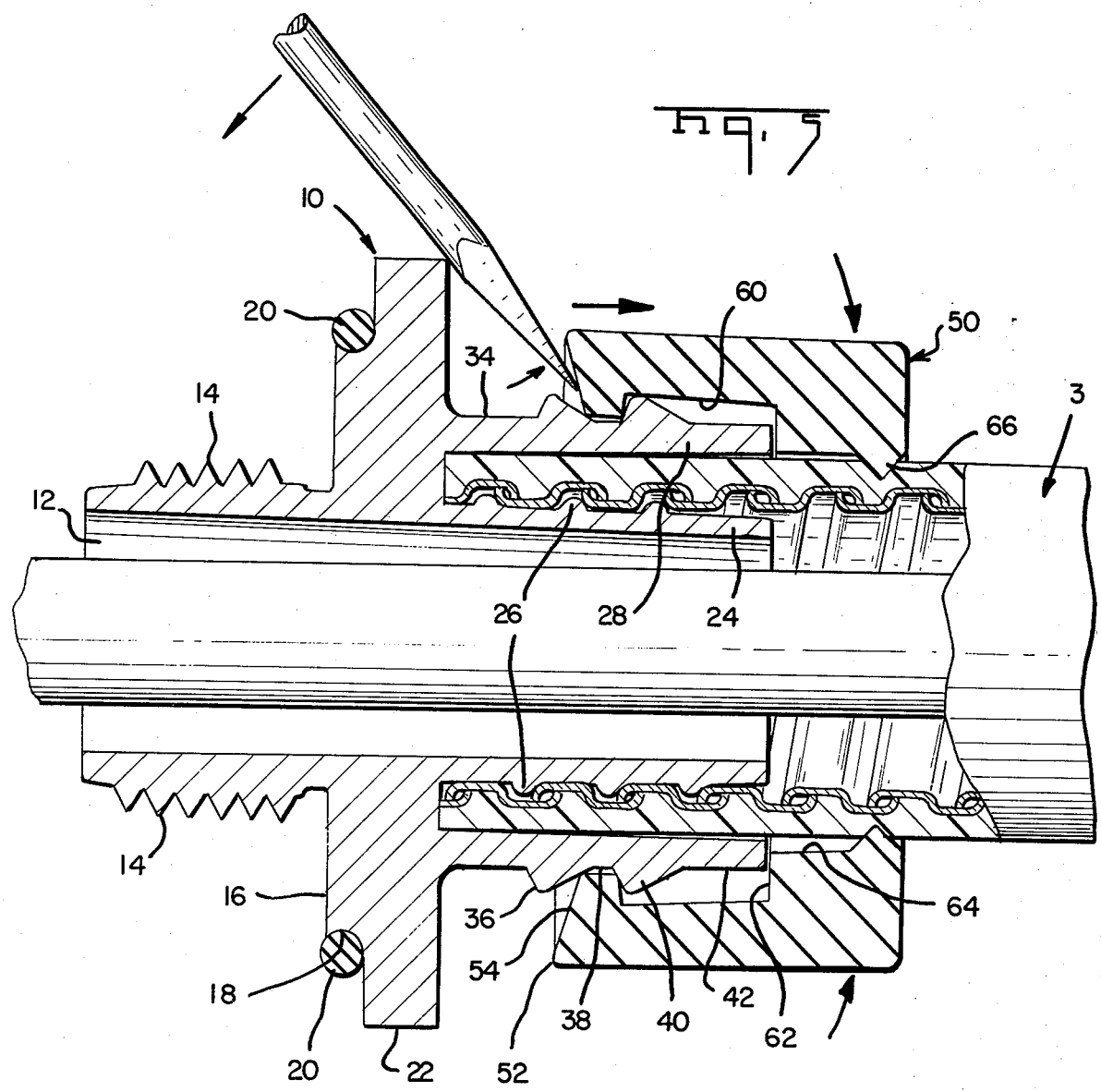
FIG. 5 is a sectional view along the line 5—5 of FIG. 1.

Returning to FIG. 2, there is shown a collar 50 which in the preferred embodiment is molded of resilient polyurethane. The selection of the preferred material will be explained in greater detail herein. Collar 50 has a first surface 54 which is sloped inwardly from edge 52 toward one edge of surface 56. This inward slope is not essential and is included for ease of assembly only. Surface 56 is flat and has a minimum width slightly greater than the width of surface 38 of body portion 10. Wall 58 which extends between the surface 56 and recessed surface 60 has a minimum height equal to the maximum height of either rib 36 or 40. Surface 60 is of sufficient width to bridge ribs 36 and 40 when surface 56 is in contact with surface 34 and surface 64 is in contact with surface 42. Additionally, surface 60 must be wide enough to bridge the distance from surface 38 to the end of surface 42 as shown in FIG. 5. This width in the preferred embodiment is easily achieved since the two distances which must be spanned are substantially equal. Wall 62 which extends from recess surface 60 to flat surface 64 must be of sufficient height to assure that surface 42 of body portion 10 does not establish restrictive contact with surface 60 when surface 56 is in contact with surface 38 (see FIG. 5). Surface 64 is approximately equal in width to surface 42. Adjacent surface 64 is tapered rib 66. The minimum vertical distance of rib 66 off the plane of surface 64 is equal to the distance between surfaces 42 and 30 of projection 28. The thickness of collar 50 as indicated by the reference numeral 68 is a function of the desired loading capacity and the material of which collar 50 is maufactured. In the preferred embodiment collar 50 is molded polyurethane having a Shore A durometer reading of 80. The passageway 70 through collar 50 is of a smaller diameter than that of projection 28 so that a substantial force is required to expand and mount collar 50 on body 10. The material of manufacture, actual dimensions, shelf life requirements and resilient memory of the collar 50 may be varied according to application. These matters of choice do not alter the concept of using a pre-loaded pre-positioned collar for achieving a liquid tight seal.

FIG. 3 is a sectional view of a connector assembly according to the present invention. The collar 50 is loaded onto body 10 using a load press at approximately a 120 pound load scale. The loading tool in conjunction with shaped surface 54 expands the collar 50 from a relaxed condition as the collar is mounted and therefore provides a store of energy. Thus, the collar 50 is retained on body 10 through the action of wall 58 abutting rib 36 and the compressive force of surfaces 56 and 64 against surfaces 38 and 42 respectively.

FIG. 4 is a sectional view of a connector assembly with the ground sleeve 24 engaging the flexible metallic conduit of a cable (all conductors have been omitted for clarity). Electrical contact is thereby established with the metallic conduit. FIG. 5 is a sectional view of a connector assembly showing the collar 50 being moved away from flange 22 and into the contact position. After surface 64 moves from contact with surface 42, the rib 66 compresses inward and establishes contact with the jacketed conduit 72. Note that surface 64 is held out of contact with the jacketed conduit 72 by rib 66. This forms a circle of maximum compression which provides an excellent moisture seal. Also note that surface 56 of collar 50 does not contact surface 38 of projection 28; the two contact points thus established with ribs 36 and 40 provide a more efficient moisture seal then provided by a flat surface seal.

FIGS. 6 and 7 show an alternative embodiment according to the instant invention. Turning to FIG. 6, it can be seen that the altered features are the increased length of ground sleeve 24 and the reduced size of rib 66. FIG. 7 illustrates the different result achieved with this embodiment. Firstly, the increased length of the sleeve 24 provides an added interior support to the conduit at the point of compression. Secondly, the reduced size of the rib 66 results in surface 64 being moved into compressive contact with the jacketed conduit 72. It is believed that some applications will benefit from the added rigidity offered by this embodiment.

Although preferred embodiments of the present invention are disclosed and shown in detail, other modifications and embodiments which would be apparent to one having ordinary skill in the art, are intended to be covered by the spirit and scope of the claims.

What is claimed is:

1. A liquid tight connector for coupling metallic flexible conduit to an electrical enclosure comprised of:
an electrically conductive connector body and a resilient collar mounted thereon, each having an axial passage therethrough, said connector body having a first end adapted for coupling said connector body to an electrical enclosure, a shoulder portion adjacent said first end and a second end adjacent said shoulder portion for coupling said connector body to said conduit, said second end having spaced apart concentric first and second projections, said first projection dimensioned to be received in said conduit and having a spiral ridge thereon for engaging the interior of said conduit, said second projection dimensioned to surround said conduit and having at least one exterior rib spaced from said shoulder on the surface thereof, said resilient collar having in a relaxed state a diameter of said passage which is less than the diameter of said second projection, and further having a first internal ridge at one end thereof, a second internal ridge proximate the other end thereof and a tapered rib forward of said second internal ridge and remote from said first internal ridge, said tapered rib having an internal diameter less than the external diameter of said conduit and said second internal ridge having an internal diameter less than the external diameter of said second projection in the relaxed state of said collar, said collar mounted on said second projection with said first internal ridge positioned between said shoulder portion and said exterior rib and said second internal ridge positioned forward of said exterior rib whereby after threading said conduit onto said spiral ridge said resilient collar is urged away from said shoulder portion and toward said exterior rib until said second internal ridge dismounts said second projection and said first internal ridge abuts said exterior rib thereby allowing said resilient collar to compress inward toward its relaxed state and said tapered rib to engage the exterior surface of said conduit.

2. The connector of claim 1 wherein said first end comprises a tapered thread for coupling said connector body to said electrical closure.

3. The connector of claim 1 further comprising:
a second exterior rib on said second projections, said second exterior rib located between said one exterior rib and said shoulder portion.

4. The connector of claim 3 wherein said shoulder portion is dimensioned to receive a sealing ring adjacent to said first end.

5. The connector of claim 3 wherein said exterior ribs are 30°-60°-90° right triangles integral at their hypotenuse with said second projection.

6. The connector of claim 5 wherein said first projection extends beyond said second projection.

7. The connector of claim 3 wherein said resilient collar is constructed of polyurethane.

8. The connector of claim 6 wherein said polyurethane has a Shore A durometer reading of 80.

9. A liquid tight connector for coupling metallic flexible conduit to an electrical enclosure comprised of:
an electrically conductive connector body and a resilient collar mounted thereon, each having an axial passage therethrough, said connector body having a first end adapted for coupling said connector body to an electrical enclosure, a shoulder portion adjacent said first end and a second end adjacent said shoulder portion for coupling said connector body to said conduit, said second end having spaced apart concentric first and second projections, said first projection dimensioned to be received in said conduit and having a spiral ridge thereon for engaging the interior of said conduit, said second projection dimensioned to surround said conduit, said resilient collar having in a relaxed state a diameter of said passage which is less than the diameter of said second projection, and further having a first internal ridge at one end thereof, a second internal ridge proximate the other end thereof and a tapered rib forward of said second internal ridge and remote from said first internal ridge, said tapered rib having an internal diameter less than the external diameter of said conduit and said second internal ridge having an internal diameter less than the external diameter of said second projection in the relaxed state of said collar, said collar mounted on said second projection with said first internal ridge positioned proximate said shoulder portion whereby after threading said conduit onto said spiral ridge said resilient collar is urged away from said shoulder portion until said second internal ridge dismounts said second projection thereby allowing said resilient collar to compress inward toward its relaxed state and said tapered rib to engage the exterior surface of said conduit.

* * * * *